(12) United States Patent
Kogure et al.

(10) Patent No.: US 7,390,968 B2
(45) Date of Patent: Jun. 24, 2008

(54) POWER-SUPPLYING DEVICE FOR SLIDING STRUCTURE

(75) Inventors: Naoto Kogure, Shizuoka (JP); Hironori Ochiai, Kariya (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/584,613

(22) Filed: Oct. 23, 2006

(65) Prior Publication Data

US 2007/0158107 A1 Jul. 12, 2007

(30) Foreign Application Priority Data

Jan. 10, 2006 (JP) ............................. 2006-002333

(51) Int. Cl.
*H01B 1/00* (2006.01)
(52) U.S. Cl. ................... 174/72 A; 174/68.1; 174/72 R; 174/70 C; 296/152; 248/629
(58) Field of Classification Search ............... 174/72 A, 174/68.1, 68.3, 69, 97–99 R, 135, 72 R, 71 R, 174/70 C; 191/22 R, 23 R; 248/629; 296/149, 296/152, 155
See application file for complete search history.

(56) References Cited

U.S. PATENT DOCUMENTS 7,075,011 B1 * 7/2006 Kogure et al. ............. 174/72 A 2002/0005014 A1 1/2002 Doshita et al.
2003/0184118 A1 10/2003 Sano et al.

FOREIGN PATENT DOCUMENTS

JP 2001-354085 12/2001
JP 2005-20895 1/2005

* cited by examiner

*Primary Examiner*—Dhiru R. Patel
(74) *Attorney, Agent, or Firm*—Kratz, Quintos & Hanson, LLP (57) ABSTRACT

There is provided a power-supplying device for a sliding structure including a wiring harness being arranged between a base and the sliding structure slidably mounted on the base, a protector mounted on the sliding structure for bending the wiring harness in a loop shape so as to receive the wiring harness therein, and a resilient member mounted on the wiring harness in a manner that the resilient member is moved together with the wiring harness in the protector in response to sliding of the sliding structure, the resilient member urging the wiring harness upward to absorb a slack of the wiring harness and expanding or contracting a loop radius of the wiring harness so that the loop radius of the wiring harness is adapted to a sliding position of the sliding structure.

4 Claims, 7 Drawing Sheets

POWER-SUPPLYING DEVICE FOR SLIDING STRUCTURE

CROSS REFERENCE TO RELATED APPLICATIONS

This application is based on Japanese Patent Application No. 2006-002333, the contents of which are hereby incorporated by reference.

BACKGROUND OF THE INVENTION

1. Field of the Invention

The present invention relates to a power-supplying device for a sliding structure such as a sliding door for constantly supplying power for such as auxiliaries in the sliding structure.

2. Description of the Related Art

Figure 7:
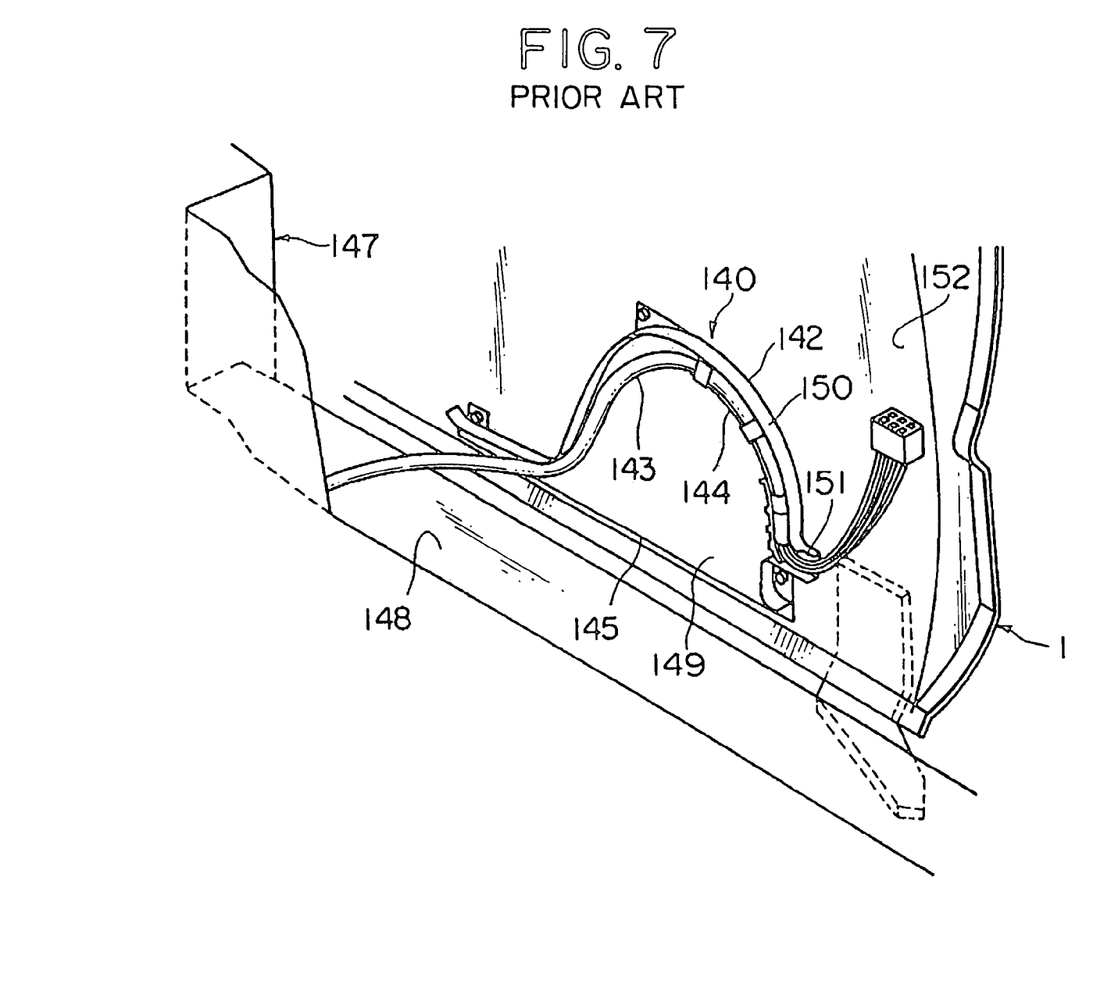
FIG. 7 is a perspective view showing a conventional power-supplying device when the sliding door is almost fully closed.
Figure 8:
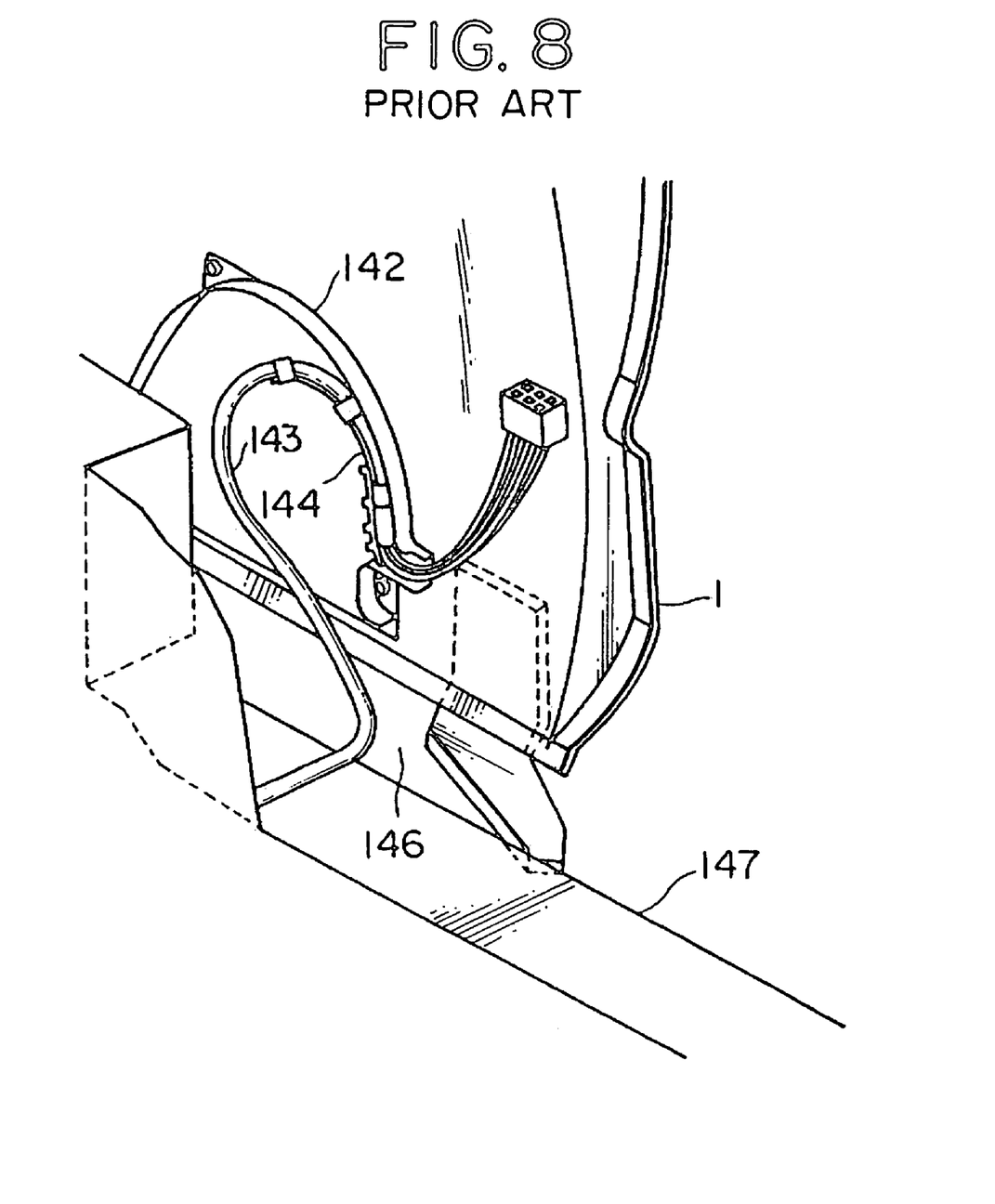
FIG. 8 is a perspective view showing the conventional power-supplying device when the sliding door is almost fully open.

FIGS. 7 and 8 show an embodiment of a conventional power-supplying device 40 for a sliding door. Such a power-supplying device is, for example, disclosed in Japanese published patent application No. 2001-354085.

This power-supplying device 40 is installed on a sliding door 1 of a vehicle. This power-supplying device 40 includes a protector 142 that consists of a base receiving a wiring harness 143 and a cover (not shown) made of synthetic resin, and a metallic flat spring 144 mounted on the protector 142 and urging the wiring harness 143 upward.

The protector 142 consists of a substantially semicircular part receiving the wiring harness 143, and a slim extension part extending backward, and includes a vertical substrate 149, a curved peripheral wall 150 extending along a top of the substrate 149, a lower oblong opening 145 for getting out the wiring harness, and a front opening 151.

The protector 142 is interposed vertically between a metallic door panel 152 and a door trim made of synthetic resin (not shown). The wiring harness 143 is bent horizontally at the lower opening 145, arranged in a vehicle body 147, held by a holder (not shown) near a step 148, and arranged in the sliding door through the front opening 151 so that the wiring harness 143 is connected to auxiliaries at the door and the wiring harness with connectors to constantly supply power.

The wiring harness 143 is made of a plurality of electric wires covered by a resilient corrugate tube made of synthetic resin. The corrugate tube is a tube having alternate circular furrows and ridges, and extended from the front opening 151 of the protector 142 to a harness holder at the vehicle body 147.

As shown in FIG. 7, the sliding door 1 is almost fully closed, and the wiring harness 143 is pulled backward and bends the flat spring 144 downward. When the sliding door 1 is half-open, the flat spring 144 absorbs a slack of the wiring harness 143 by urging the wiring harness 143 upward. As shown in FIG. 8, when the sliding door 1 is almost fully open, the wiring harness 143 is pulled forward while bending the flat spring 144 downward.

However, according to a conventional structure described above, because the flat spring 144 urges upward the wiring harness 143 to absorb the slack, a height of the protector 142 should be large in particular when an open/close stroke of the sliding door 1 is large. Therefore, there is a problem that a space for arranging the auxiliaries and the parts becomes small. There is another problem that a cost of the power-supplying device becomes high because the device needs a metallic flat spring 144, brackets for fixing the flat spring 144 and the like. There is another problem that a lot of time is required for fixing the flat spring 144.

Therefore, a power-supplying device disclosed in Japanese published patent application No. 2005-20895 has no flat spring for preventing the protector from upsizing. Rigidity (spring force) of the wiring harness opens the loop of the wiring harness by the harness-guiding member. Thus, the height of the protector can be set lower than that of the conventional protector. Further, a space for arranging the parts in the sliding door can be large, and a flexibility of arranging the parts in the sliding door can be increased.

However, the power-supplying device disclosed in Japanese published patent application No. 2005-20895 needs a resilient member such as a spring for urging downward a second guiding roller of the harness-guiding member. Because the resilient member is contracted when the sliding door is fully open, pulling force for the wiring harness increases. Therefore, a snapping of the wire in the wiring harness may occur. Further, structures for fixing and sliding the guiding rollers of the harness-guiding member are required, so that the structure of the power-supplying device becomes complex, the cost of the power-supplying device is increased, and assembling process becomes hard.

Accordingly, an object of the present invention is to provide a power-supplying device for a sliding structure that allows the structure to be simple, reduces loads of the wiring harness, and allows the protector to be downsized.

SUMMARY OF THE INVENTION

In order to attain the object, according to the present invention, there is provided a power-supplying device for a sliding structure including:

a wiring harness being arranged between a base and the sliding structure slidably mounted on the base;

a protector mounted on the sliding structure for bending the wiring harness in a loop shape so as to receive the wiring harness therein; and a resilient member mounted on the wiring harness in a manner that the resilient member is moved together with the wiring harness in the protector in response to sliding of the sliding structure, the resilient member urging the wiring harness upward to absorb a slack of the wiring harness and expanding or contracting a loop radius of the wiring harness so that the loop radius of the wiring harness is adapted to a sliding position of the sliding structure.

Preferably, the resilient member is mounted on the wiring harness in a manner that an expansion-contraction mode of the loop radius of the wiring harness is switched at around a center position of sliding of the sliding structure.

Preferably, the resilient member includes a guiding member for bending the wiring harness in a loop shape.

Preferably, the power-supplying device further includes a holder having a through hole, into which the resilient member is inserted, and a fitting member to be fitted to the wiring harness, wherein the resilient member is fitted to the wiring harness by the holder on a condition that the resilient member is inserted into the through hole.

These and other objects, features, and advantages of the present invention will become more apparent upon reading of the following detailed description along with the accompanied drawings.

DETAILED DESCRIPTION OF THE PREFERRED EMBODIMENTS

A first embodiment of a power-supplying device 10 for a sliding structure according to the present invention will be described with reference to FIGS. 1 to 6.

As shown in FIGS. 1 to 4, the power-supplying device 10 includes a wiring harness 3, a protector 4, a holder 5, and a flat spring 6 as a resilient member.

Figure 1:
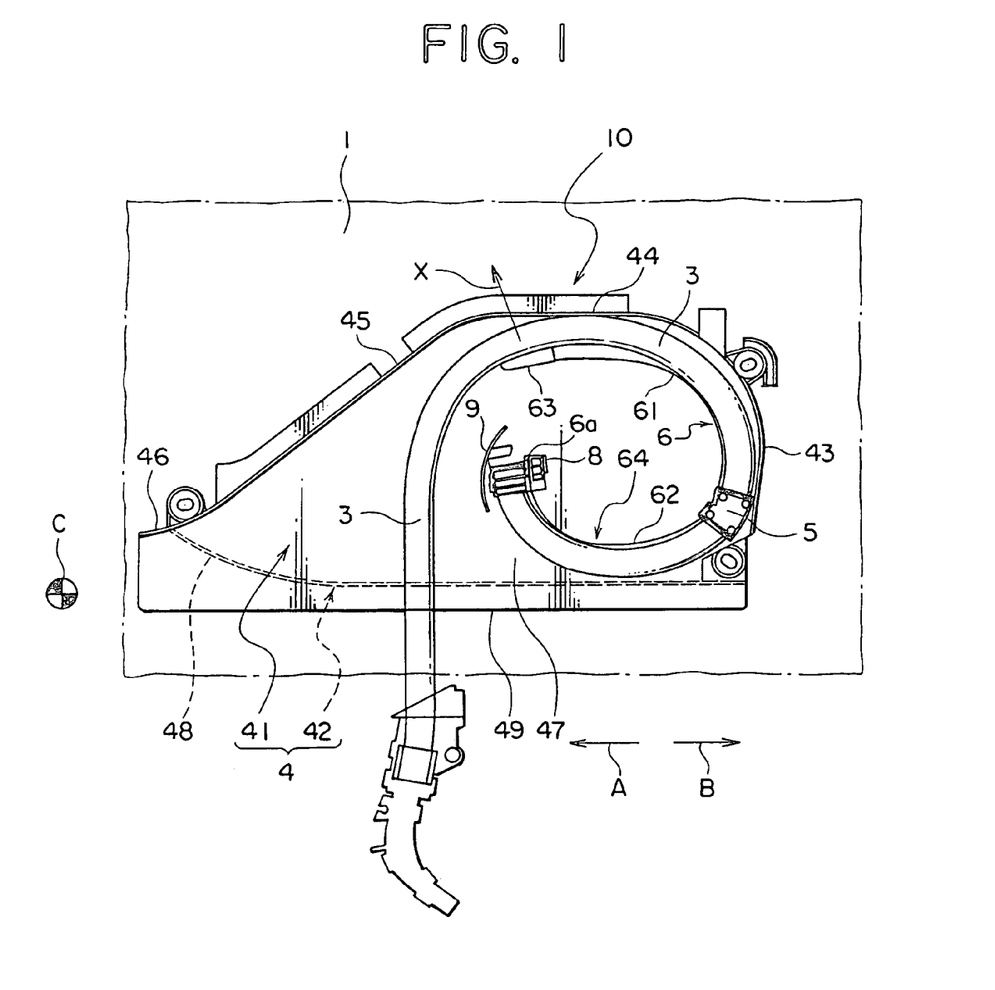
FIG. 1 is a front view showing a power-supplying device according to an embodiment of the present invention when a sliding door is half-open.

A sliding door 1 is a sliding structure, for example, a sliding door of a van. Various auxiliaries such as a power-window motor, a door-lock unit, and a speaker are mounted inside the sliding door. The auxiliaries are connected to a connector (not shown) mounted on an end of the wiring harness 3. Power is supplied to the auxiliaries from a vehicle body (not shown) through the wiring harness 3.

The other end of the wiring harness 3 is connected to a connector of a wiring harness at the vehicle body side through a connector. The wiring harness 3 is arranged in the sliding door 1 with a protector (not shown) mounted on an inner panel of the sliding door 1.

The sliding door 1 is slidably attached to the vehicle body 147 (see FIG. 8). The sliding door 1 slides in an opening direction A and a closing direction B. (When opening the sliding door 1, the sliding door 1 is once moved to a side of the vehicle body.) An inner panel is mounted on a vehicle body side of the sliding door 1. A hinge roller is mounted on a lower end of the sliding door 1 for slidably engaged with a rail (not shown) mounted on a lower side of the vehicle body.

The wiring harness 3 includes a plurality of electric wires, and connectors attached to ends of the wires. The wiring harness 3 is interposed between the vehicle body and the sliding door 1 as the sliding structure. The corrugate tube covers the wiring harness 3.

The electric wire includes a conductive core wire and a coating made of insulating synthetic resin for covering the core wire. The electric wire is so-called a coated wire. The connector includes a conductive terminal fitting and an insulating connector housing. The terminal fitting is attached to ends of the wire, and electrically connected to the core wire. The connector housing is formed in a box shape, and receives the terminal fitting.

The protector 4 consists of a base 41 and a cover 42. The protector is substantially as half high as a conventional protector. While a conventional harness receiving part has a substantially semicircular shape, the harness receiving part of the present invention is low, compact, and surrounded by a peripheral wall consisting of a short vertical front end wall 43, a short horizontal wall 44 at a ceiling side disposed over the front end wall 43 and extended backward in a curved shape, a long wall 45 extended straight from the wall 44 downwardly, and a short wall 10 disposed at a backside of the wall 45 and extended horizontally, and an oblong vertical substrate 47 perpendicular to the peripheral wall. A horizontal length of the protector 2 is substantially same as that of the conventional protector.

Incidentally, in figures, only a harness guiding wall 48 having a skirt shape disposed at the lower end of the cover 42 and curved outward is shown with a broken line, and the other cover are omitted for showing an interior of the base 3. An oblong harness outlet 49 is formed between the lower end of the substrate 41 and the lower end of the cover 42, namely, the harness guiding wall 48 that is curved outward.

An opening (not shown) for getting out the wiring harness is formed on the vertical substrate 47 of the base 41 abutting on a metallic door panel of the sliding door 1 at the center height thereof. The wiring harness 3 getting out from the opening to a rear wall side of the base 41 is connected to a wiring harness and the auxiliaries in the sliding door 1. A holder 8 for holding the wiring harness 3 and a regulating wall 9 for regulating a movement of the wiring harness 3 are formed around the opening of the substrate 47.

The holder 8 holds the wiring harness 3 and fastens an end of the flat spring 6. The regulating wall 9 regulates the movement of the slack of the wiring harness 3 when the sliding door 1 is moved in the opening direction A from a half-open state. When the sliding door 1 is fully open, the slack of the wiring harness 3 is curved in a loop shape along the regulating wall 9.

Figure 2:
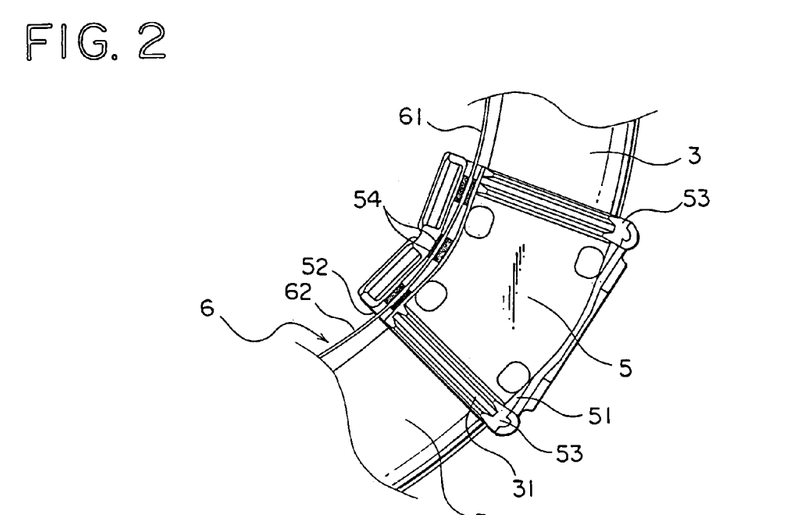
FIG. 2 is a schematic diagram of a holder in FIG. 1.

As shown in FIG. 2, the holder 5 is made of synthetic resin, and formed in a hollow square pole shape. The holder 5 includes a fitting member 51 corresponding to an outer shape of a corrugate tube 31 covering the wiring harness 3, and a through hole 52 into which the flat spring 6 is inserted. The holder 5 has a hinge. The fitting member 51 consists of a pair of clipping members. A penetrating projection 53 is formed on an inner wall of the fitting member 51. The penetrating projection 53 bites an outer furrow of the corrugate tube 31 so that a rotation and a movement of the corrugate tube 31 relative to the holder 5 are regulated.

The through hole 52 is formed in a slit shape so that the flat spring 6 is inserted thereto. A plurality of fixing parts 54 (six in FIG. 2) are arranged mutually facing at an inner wall of the through hole 52. The fixing parts 54 are made of resilient members. A pair of fixing members clips the flat spring 6 so that the flat spring 6 is fixed to the holder 5.

A mounting position of the holder 5 relative to the wiring harness 3 is properly set corresponding to a length of the wiring harness 3 received in the protector 4, a sliding range of the sliding door 1, and a slack absorbing length of the wiring harness 3.

In this embodiment, the flat spring 6 is fitted to the wiring harness 3 with the holder 5. However, the present invention is not limited to this. Various embodiments can be used. For example, the flat spring 6 may be fitted to the wiring harness 3 with a fixing member such as a tape.

The flat spring 6 is made of a long plate of resilient metal, resilient member, or the like. The holder 8 fastens an end 6a of the flat spring 6 so that the flat spring 6 is fixed to the protector 4. A width of the flat spring 6 is a width receivable in the protector 4. The flat spring 6 includes a lifting part 61 and a guiding part 62 extending from the lifting part 61. The flat spring 6 is mounted on the holder 5 so that the holder 5 is interposed between the lifting part 61 and the guiding part 62.

The lifting part 61 is formed in an arc shape so that the wiring harness 3 is urged on a horizontal wall 45 (inner wall) of the protector 4. A first flat spring 6 includes an abutting member 63 having a triangle section at the other end. The abutting member 63 abuts on the wiring harness 3 and protects the wiring harness 3 from damages. A length of the lifting part 61 is properly set so that a spring force (resilient force) of the flat spring 6 is strong enough to surely lift the wiring harness 3 in a direction X against the harness slack in the protector 4.

Figure 3:
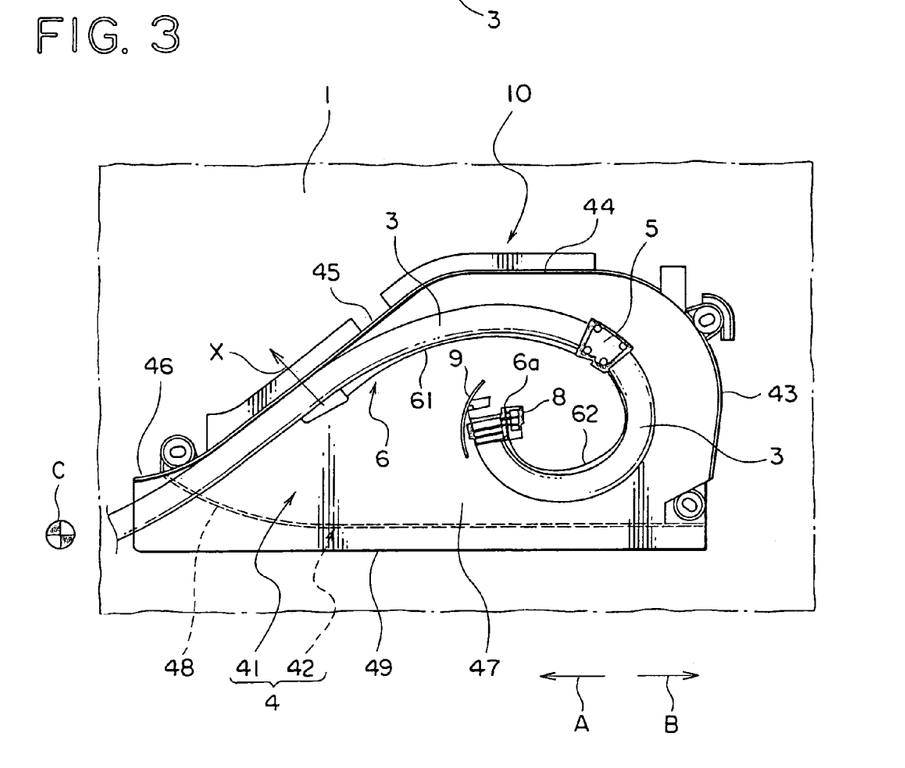
FIG. 3 is a front view showing the power-supplying device when the sliding door is closed.

The guiding part 62 is extended from the holder 5 to the end 6a held by the holder 8. A thickness of the guiding part 62 is properly set so that the wiring harness 3 is curved in a loop shape between the holder 5 and the holder 8 corresponding to a movement of the holder 5 owing to sliding of the sliding door 1, and that the loop 64 is deformable corresponding to the movement of the holder 5. As shown in FIG. 3, the guiding member 62 is formed in an arc shape so that the holder 5 is at a specific position in the protector 4 when the sliding door 1 is closed. Incidentally, in this embodiment, the thickness of the guiding part 62 is equal to that of the whole flat spring 6. However, the thickness of the lifting part 61 may be different from that of the guiding part 62.

Next, in the power-supplying device 10, an embodiment of attaching the flat spring 6 against the wiring harness 3 will be explained.

When the wiring harness 3 is temporarily arranged in the protector 4, the fitting member 51 of the holder 5 is positioned at a specific position of the wiring harness 3. Then, the flat spring 6 is inserted into the through hole 52 of the holder 5. The end 6a of the flat spring 6 is fastened at the holder 8. Then, the abutting member 63 abuts on the wiring harness 3. Thus, the flat spring 6 is fitted to the inside of the wiring harness 3.

According to the power-supplying device 10, the flat spring 6 is fitted to the wiring harness 3 so that the flat spring 6 is moved together with the wiring harness 3 in the protector 4 corresponding to the sliding of the sliding door 1. The flat spring 6 lifts the wiring harness 3 in the direction X against the harness slack. The radius of the loop 64 is expanding and contracting to be a radius corresponding to the sliding position of the sliding door 1.

Incidentally, in this embodiment, the first spring 6 and a second spring 7 is formed by a single flat spring. However, various embodiments can be used. For example, a plurality of flat springs is stacked to adjust the spring force (resilient force).

Next, an embodiment of an operation of the power-supplying device 10 will be explained with reference to FIGS. 1 to 4.

As shown in FIG. 3, in a state that the sliding door 1 is closed, the wiring harness 3 is led out from the rear end of the harness outlet 49 of the protector 4 and pulled backward from a harness holder C at the vehicle step side. In this case, the lifting part 61 of the flat spring 6 lifts the wiring harness 3 in the direction X against the harness slack, and urges the wiring harness 3 on the horizontal wall 45 (inner wall) of the protector 4. The guiding part 62 guides the holder 5 at the specific position in the protector 4. The loop 64 has an arc shape having a standard radius R0.

When the sliding door 1 is moved in the opening direction A to the half-open state shown in FIG. 1 from the fully closed state in FIG. 3, the wiring harness 3 would droop largely between the sliding door 1 and the vehicle body, but the lifting part 61 of the flat spring 6 lifts the wiring harness 3 in the direction X against the harness slack. Then, the holder 5 and the flat spring 6 are moved together with the wiring harness 3 in the closing direction B. The guiding part 62 of the flat spring 6 expands the radius of the loop to a maximum radius R1 from the standard radius R0. Thus, the wiring harness 3 is curved in a loop shape along the front wall 43 to absorb the slack.

Namely, the flat spring 6 is fitted to the wiring harness 3 to switch the expansion and contraction of the loop 64. Therefore, when the sliding door 1 is half-open, the flat spring 6 makes the loop radius of the loop 64 maximum.

Figure 4:
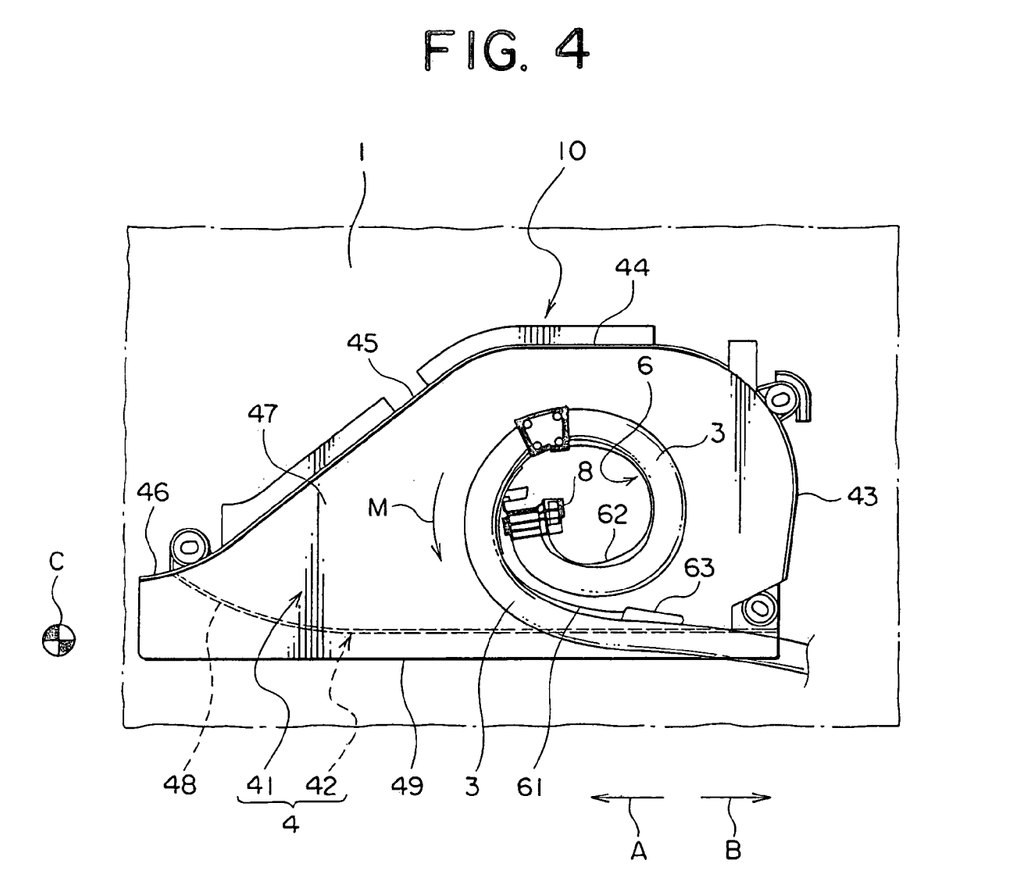
FIG. 4 is a front view showing the power-supplying device when the sliding door is full open.

When the sliding door 1 is slid from the half-open state shown in FIG. 1 to the fully open state shown in FIG. 4, the wiring harness 3 is led out forward through the harness outlet 49 of the protector 4 from the harness holder C.

As shown in FIGS. 1 to 4, the holder 5 and the flat spring 6 are moved to a direction of an arrow M together with the wiring harness 3. At this time, the lifting part 61 of the flat spring 6 is moved along the regulating wall 9 together with the wiring harness 3 and bent backward against the urging force. The holder 5 is moved to an upper side of the holder 8 together with the wiring harness 3. The guiding part 62 of the flat spring 6 is contracted to the minimum radius R2 smaller than the standard radius R0 corresponding to the movement of the holder 5, so that the wiring harness 3 is curved in a loop shape at the center of the protector 4.

According to the power-supplying device 10 of the present invention, the wiring harness 3 is maintained to be lifted in the direction X against the harness slack in the protector 4. When the sliding door 1 is moved, the flat spring 6 is moved together with the wiring harness 3 owing to the rigidity of the wiring harness 3 to deform the loop 64 of the wiring harness 3 corresponding to the sliding position. Therefore, the load on the wiring harness 3 when the sliding door 1 is fully open can be reduced. The snapping of the wiring harness 3 is surely prevented.

For switching the expansion and the contraction of the loop 64 when the sliding door 1 is half-open, the flat spring 6 is fitted to the wiring harness 3, so that the maximum loop radius of the loop 64 is attained at the half-open state. Therefore, the slack of the wiring harness 3 in the protector 4 can be minimized. Accordingly, the height of the protector 4 can be reduced, the space for the other parts in the sliding door 1 can be increased, and the flexibility of arranging the other parts can be increased.

Further, the guiding part 62 is formed on the flat spring 6 for bending the wiring harness 3 in a loop shape, so that the wiring harness 3 is curved in a shape suitable for the sliding position of the sliding door 2. Therefore, the wiring harness 3 is suitably curved in the protector 4.

The flat spring 6 is inserted into the through hole 52 of the holder 5. The holder 5 is fitted to the wiring harness 3 by the fitting member 51 of the holder 5. Therefore, the flat spring 6 is easily fitted into the wiring harness 3. Accordingly, productivity of the power-supplying device 10 is increased.

Figure 5:
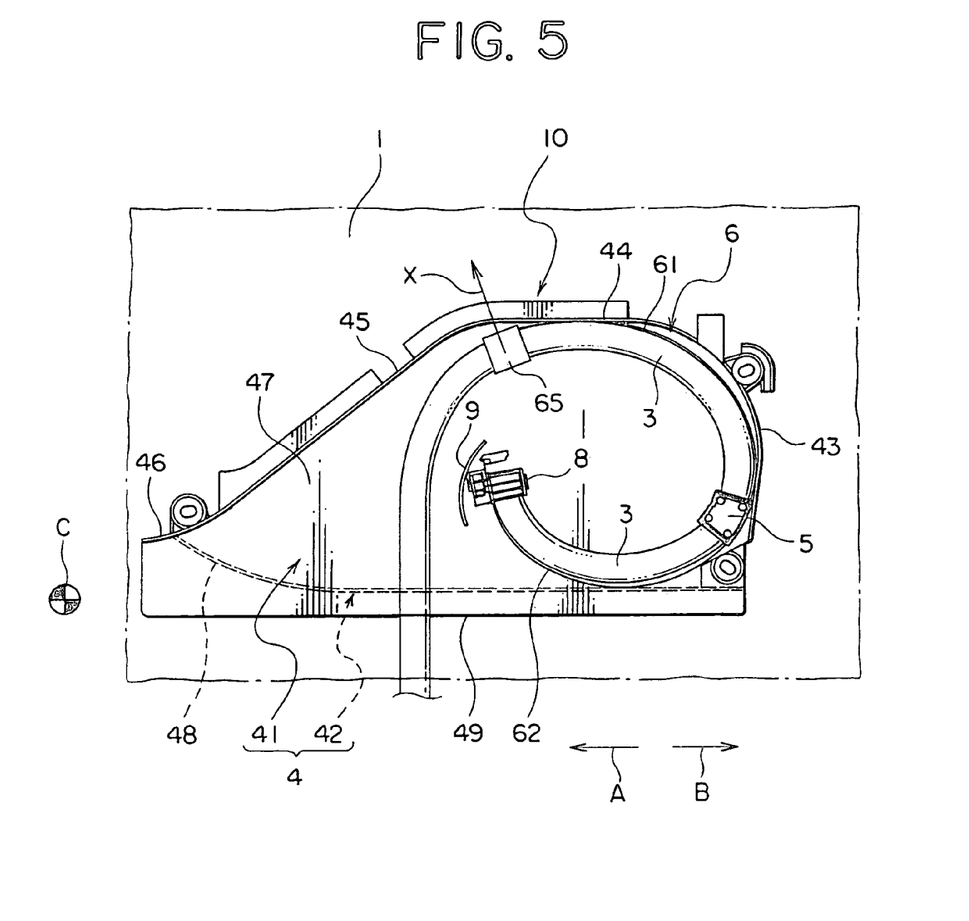
FIG. 5 is a front view showing the power-supplying device according to another embodiment of the present invention when the sliding door is half-open.

Incidentally, according to the above, the flat spring 6 is fitted to an inner wall of the wiring harness 3. However, the present invention is not limited to this. For example, as shown in FIG. 5, the flat spring 6 may be fitted to an outer wall of the wiring harness 3 and pull the wiring harness 3. In this structure, a fixing part 65 for fixing the other end of the flat spring 6 to the wiring harness 3 is provided instead of the abutting member 63. Such a structure allows the minimum radius of the flat spring 6 to be increased, therefore, flexibility of selecting the flat spring 6 is increased.

Figure 6:
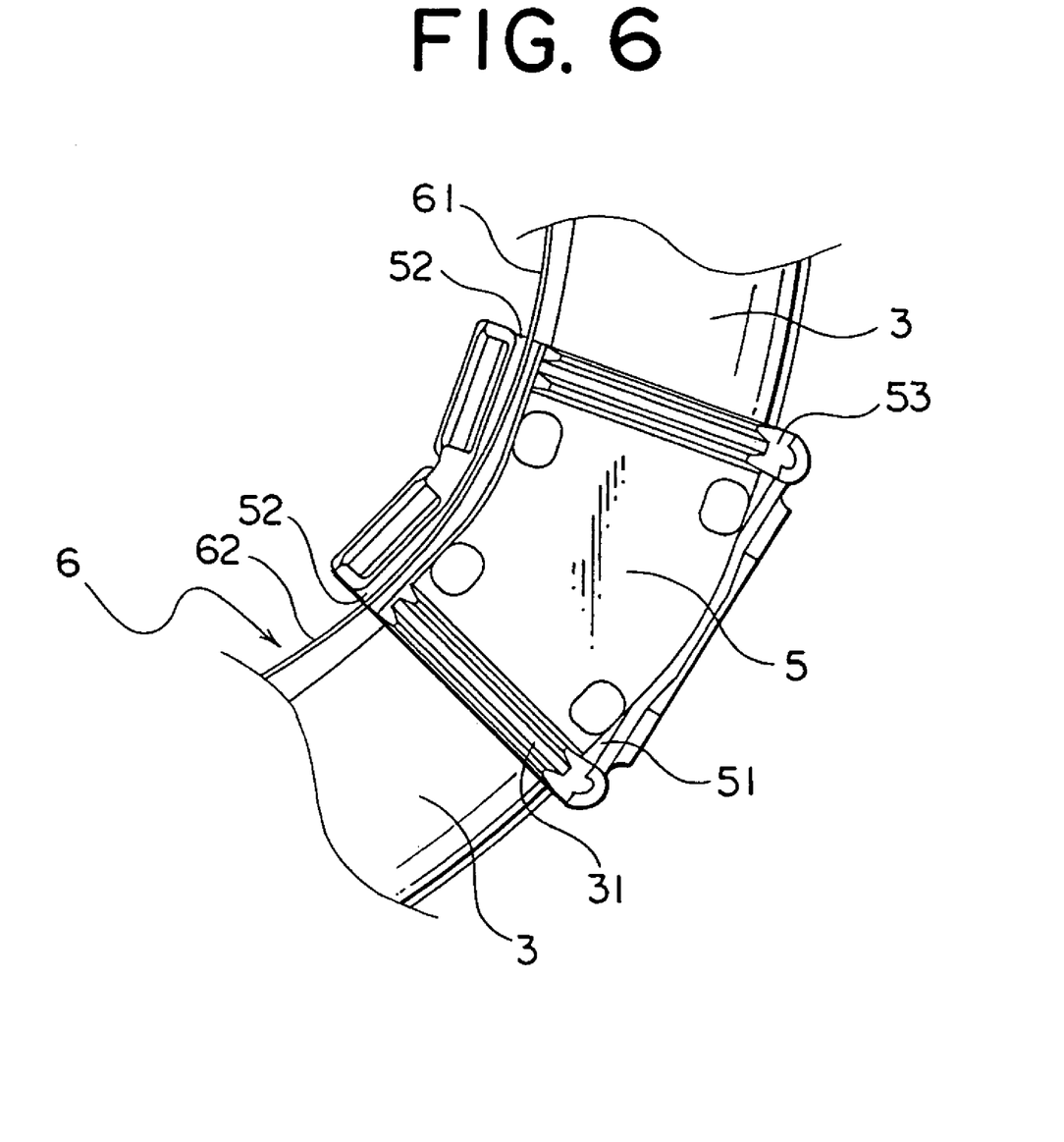
FIG. 6 is a schematic view showing another holder according to the present invention.

According to the present embodiment, the fixing parts 54 are formed on an inner wall of the through hole 52. However, according to the present invention as shown in FIG. 6, the fixing parts 54 may not provided on the inner wall of the through hole 52.

In a case that the fixing parts 54 are mounted on the inner wall of the through hole 52, when the sliding door 1 is half-open, a gap is formed between the wiring harness 3 and the flat spring 6. However, when the sliding door 1 is open and the radius of the loop 64 is reduced, the wiring harness 3 is prevented from falling down owing to the rigidity of the flat spring 6. On the other hand, in a case that no fixing part 54 is mounted on the inner wall of the through hole 52, the flat spring 6 constantly follows the wiring harness 3, and the wiring harness 3 is suitably curved.

According to the embodiment described above, the flat spring 6 includes the lifting part 61 and the guiding part 62. However, the flat spring 6 may consist of only the lifting part 61. In this case, the front wall 43 and the horizontal wall 44 of the protector 4 are used. Alternatively, the front wall 43 may be an arc shape, and the wiring harness 3 is curved in a loop shape corresponding to the movement of the lifting part 61 of the flat spring 6.

According to the embodiment described above, the flat spring 6 is used as the resilient member. However, a resilient wire, or a plurality of resilient wires can be used as the resilient member.

According to the embodiment described above, the power-supplying device 10 supplies the power to the auxiliaries mounted on the sliding door 1. However, the power-supplying device 10 may supply the power to the auxiliaries mounted on a roof panel slidably relative to a ceiling. Further, the power-supplying device 10 may be used except for a vehicle.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power-supplying device for a sliding structure comprising:

a wiring harness being arranged between a base and the sliding structure slidably mounted on the base;

a protector mounted on the sliding structure for bending the wiring harness in a loop shape so as to receive the wiring harness therein with the wiring harness passed through a vertical substrate of the base; and a resilient member mounted on the wiring harness in a manner that the resilient member is moved together with the wiring harness in the protector in response to sliding of the sliding structure, the resilient member having a lifting part urging the wiring harness upward to absorb a slack of the wiring harness and expanding or contracting a loop radius of the wiring harness so that the loop radius of the wiring harness is adapted to a sliding position of the sliding structure.

2. The device as claimed in claim 1, wherein the resilient member is mounted on the wiring harness in a manner that an expansion-contraction mode of the loop radius of the wiring harness is switched at around a center position of sliding of the sliding structure.

3. The device as claimed in claim 1, wherein the resilient member includes a guiding member for bending the wiring harness in a loop shape.

4. The device as claimed in claim 1, further comprising:

a holder having a through hole, into which the resilient member is inserted, and a fitting member to be fitted to the wiring harness, wherein the resilient member is fitted to the wiring harness by the holder on a condition that the resilient member is inserted into the through hole.

* * * * *